March 10, 1936. H. F. GLUNZ Re. 19,886

METHOD OF AND APPARATUS FOR APPLYING SEALING CLOSURES TO BOTTLES AND OTHER CONTAINERS

Original Filed April 14, 1934 4 Sheets-Sheet 1

INVENTOR
HENRY F. GLUNZ
BY
Darby & Darby
ATTORNEYS

March 10, 1936. H. F. GLUNZ Re. 19,886

METHOD OF AND APPARATUS FOR APPLYING SEALING CLOSURES TO BOTTLES AND OTHER CONTAINERS

Original Filed April 14, 1934 4 Sheets-Sheet 2

INVENTOR
HENRY F. GLUNZ
BY
Darby & Darby
ATTORNEYS

March 10, 1936. H. F. GLUNZ Re. 19,886

METHOD OF AND APPARATUS FOR APPLYING SEALING CLOSURES TO BOTTLES AND OTHER CONTAINERS

Original Filed April 14, 1934 4 Sheets-Sheet 3

INVENTOR
HENRY F. GLUNZ
BY Darby & Darby
ATTORNEYS

March 10, 1936. H. F. GLUNZ Re. 19,886

METHOD OF AND APPARATUS FOR APPLYING SEALING CLOSURES TO BOTTLES AND OTHER CONTAINERS

Original Filed April 14, 1934 4 Sheets-Sheet 4

INVENTOR
HENRY F. GLUNZ
BY
Darby & Darby
ATTORNEYS

Reissued Mar. 10, 1936 Re. 19,886

UNITED STATES PATENT OFFICE 19,886

METHOD OF AND APPARATUS FOR APPLYING SEALING CLOSURES TO BOTTLES AND OTHER CONTAINERS

Henry F. Glunz, Saratoga Springs, N. Y., assignor of one-half to Robert M. McMullen, New York, N. Y.

Original No. 2,013,304, dated September 3, 1935, Serial No. 720,560, April 14, 1934. Application for reissue January 22, 1936, Serial No. 60,332

23 Claims. (Cl. 226—83)

This invention relates to improvements in methods of and apparatus for applying sealing closures to bottles and other containers and more particularly closures formed from a cellulose acetate compound.

The object of the invention is to provide a method of and apparatus for applying sealing closures of this nature to bottles and containers of various sorts, which is simple in operation and structure, easily carried out and operated, and efficient in effecting the application of the closure so that a liquid tight and air tight seal of the contents in the bottle or container is produced.

A further object of the invention is to provide a method and apparatus of the nature above referred to wherein the cellulose acetate sealing closure, while being applied to the bottle or container, is first acted upon so that it will be tightly and smoothly drawn over the open end of the bottle or container and then will be subjected to an external flexible and resilient pressure combined with the application of heat so that it is caused to have a tight conforming and molded application to the neck of the bottle or container.

A further object of the invention is to provide a method and apparatus of the nature referred to wherein the cellulose acetate sealing closure, while being applied to the bottle or container, will be acted upon so that its outer peripheral edge zone will be subjected to a flexible and resilient pressure and the application of a heat of an increasing temperature so that it will first become pressed into a conforming and molded fit with the exterior surface of the neck of the bottle or container and finally become fuzed with said surface.

Other objects of the invention will appear more fully hereinafter.

The invention consists substantially in the steps, modes of operation, combination of elements and details of arrangement of parts, all as will be more fully hereinafter set forth, as shown in the accompanying drawings and finally pointed out in the appended claims.

In the accompanying drawings I have shown an illustrative structure and apparatus for embodying the principles of my invention and the manner of operating the same in carrying out my new and improved method and wherein,—

The same part is designated by the same reference numeral wherever it occurs throughout the several views.

In carrying out the objects of my invention I propose to use blanks made from thin sheets of cellulose acetate material for the closures for the bottles or containers. The size of these blanks should be such that when they are applied to the opening of the bottle or other container they will have an outer peripheral edge portion that will be adapted to be folded down on the outside of the neck of the bottle or container. These blanks may be shaped by hand or by any suitable stamping device.

Figure 1:
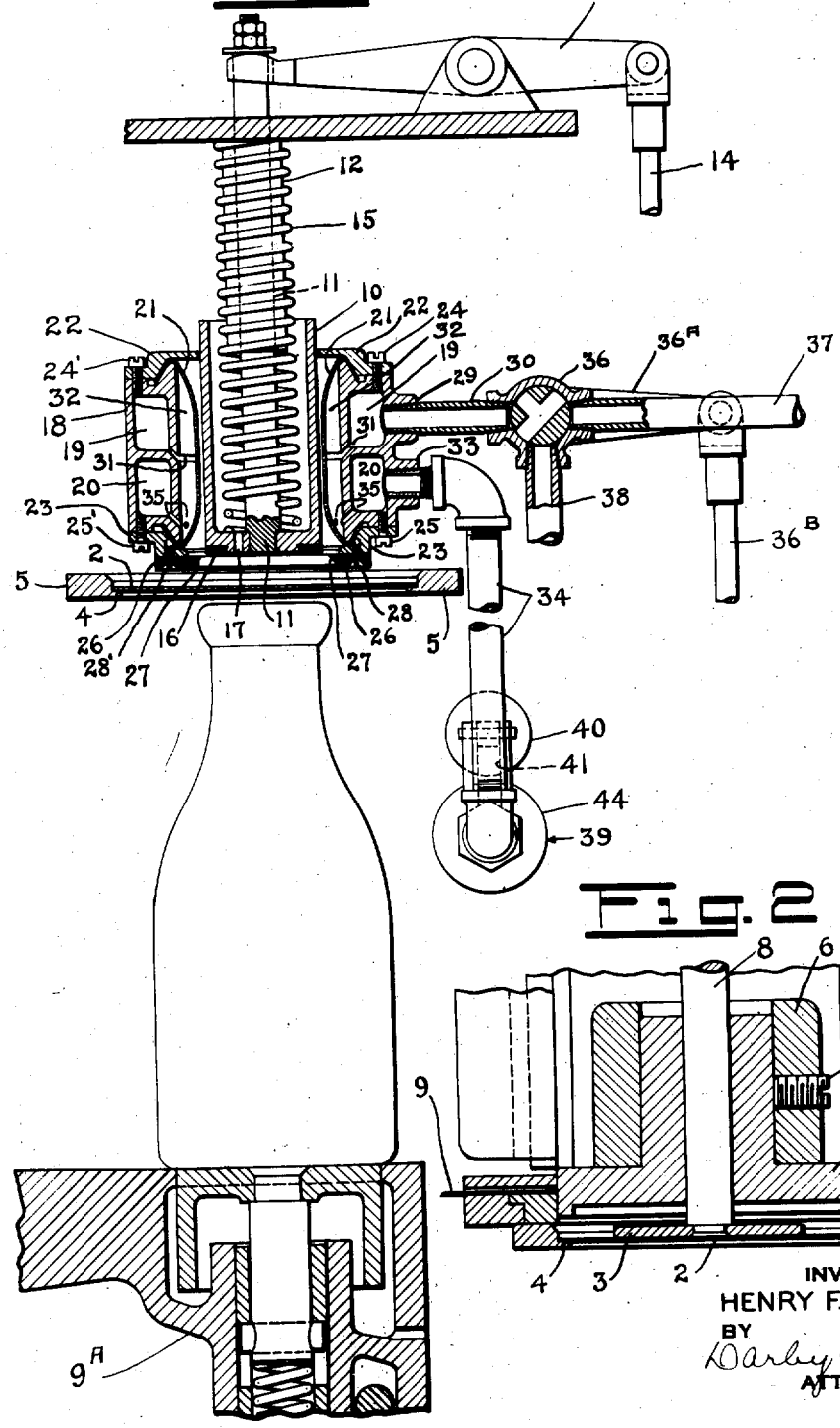
Figure 1 is a broken view in vertical section of an apparatus adapted for carrying out my invention and showing the container in the form of a bottle in position for application of a sealing closure of the open end thereof.
Figure 2:
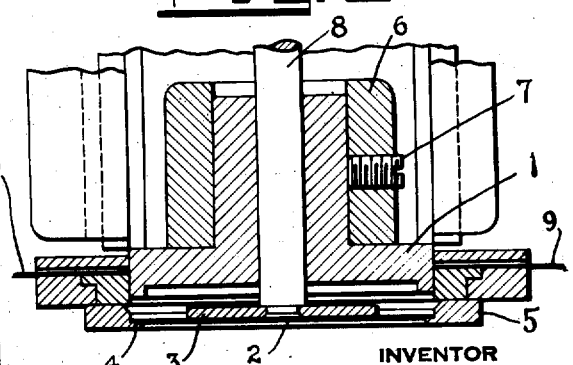
Figure 2 is a broken detail view in section, illustrating a form of mechanism, which may be employed for stamping out the closure blanks of cellulose acetate material which are to be applied to the container.

In Fig. 2 of the drawings I have indicated suitable mechanism that may be employed for automatically stamping out the closure blanks from a sheet of cellulose acetate material. This mechanism comprises a die punch designated at 1 which is adapted to cooperate with a die plate shown in Fig. 2 and which cuts a circular blank disc 2 out of a sheet of cellulose acetate material indicated at 9. In the particular blank cutting mechanism as illustrated the die punch is supported and reciprocated from a sleeve 6 and is removably held therein by a screw 7. When the die punch is actuated to stamp out the circular blank 2 by suitable operating mechanism (not shown) the said blank is caused to be dislodged from the die and to be placed on the ledge 4 of a disc holding ring 5 by means of a pad 3 supported on the stem 8 which is reciprocally mounted in the blank forming mechanism. After the stamped out circular blank 2 of the cellulose acetate material has been placed in the disc holding ring 5, the ring is caused to be moved to the closure applying mechanism in any suitable manner and positioned with respect to mechanism as indicated in Fig. 1. It will be noted by referring to Fig. 1 that when the disc holding ring has been properly positioned with respect to the closure applying mechanism the closure disc of cellulose acetate material is supported over and centered with respect to the mouth of the bottle or container to which the closure disc is to be applied.

In Fig. 1 of the drawings, the bottle to which a closure is to be applied is shown supported in position with respect to the closure applying mechanism. The bottle is brought into proper position under the closure applying mechanism by suitable means indicated generally at 9A. The bottle is so positioned under the closure applying mechanism that the open end of the neck portion thereof is presented toward the central portion of the cap blank 2 and in opposed relation to a central cup or plunger 10 of the closure applying mechanism. The cup or plunger 10 is carried by a rod 11. The rod 11 works loosely in a sleeve 12 and may be actuated in any suitable manner in proper timed relation as by means of the connections 13 and 14.

A spring 15 serves to permit the tubular cup or plunger 10 to yield against the action of said spring for movement lengthwise with respect to the sleeve 12.

Figure 3:
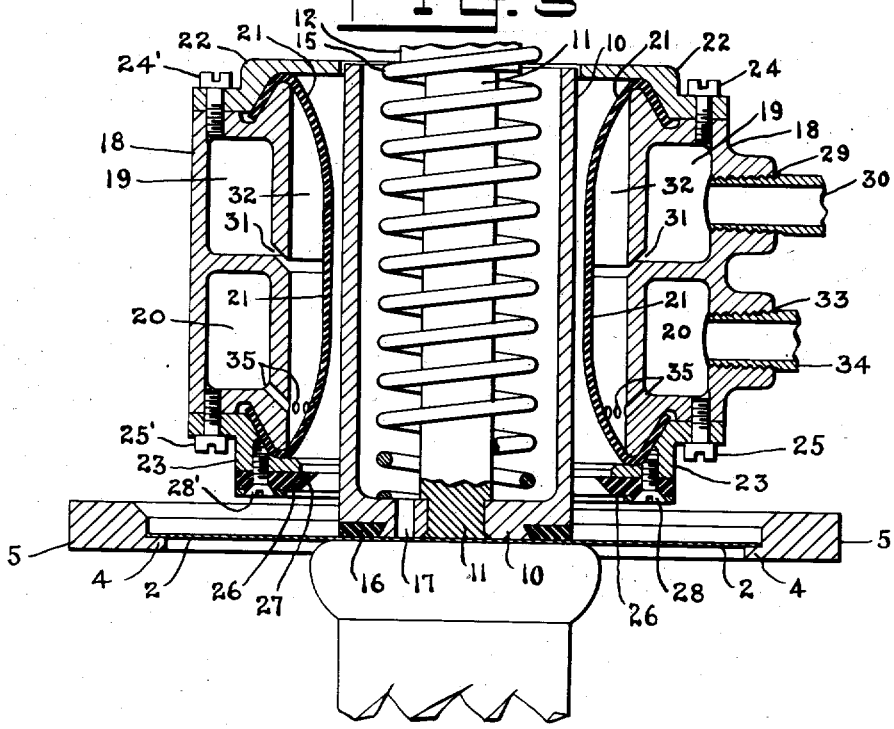
Figure 3 is a view of the closure applying mechanism of the apparatus and showing the parts thereof after the bottle has beeen lifted into position for its open end to contact with a blank of cellulose acetate material which is to constitute the closure.

The closed end of the cup member or plunger 10 cooperates with the end surface of the bottle neck to constitute in effect a clamp to clamp the closure blank 2 between them as indicated in Fig. 3. The closed end of the cup or plunger 10 is provided with a rubber ring member 16. This rubber ring 16 due to its resilient nature permits the closed end of the plunger cup 10 to make the material of the closure blank conform with any variation that might exist in the surface of the mouth of the bottle when the closure blank is clamped to the bottle mouth by said plunger. The closed end of the cup or plunger 10 is also formed with a vent opening 17 which permits the escape of any moisture which might accumulate on the top of the closure blank due to the operations of the mechanism which will be more fully hereinafter described.

The cup member or plunger 10 is slidably supported in a main casting of the closure applying apparatus. This main casting is designated generally by the numeral 18 and will be hereinafter referred to as the closure applying head. The closure applying head 18 is formed with two chambers 19 and 20 and has a ring 21 of flexible and resilient material, such for example as rubber, mounted within the same and in such a manner that it forms a third chamber 32. The rubber ring 21 is mounted in the closure applying head so that its upper and lower edges are rigidly anchored to the same by means of the clamping collars 22 and 23. The clamping collars 22 and 23 are secured to the closure applying head 18 by means of the screws 24, 24' and 25, 25'.

The clamping collar 22 is so shaped that its inner edge engages with the side of and forms a guide for the plunger cup member 10. The lower clamping collar 23 is so constructed that its inner edge portion forms an opening of a sufficient diameter that it will permit the entry of the bottle neck into the closure applying head. The lower clamping collar 23 is also provided with a rubber ring 26 formed with an inclined face 27. The rubber ring 26 is secured to clamping collar 23 by means of screws 28, 28' and provides a resilient guide for the neck of the bottle as it is advanced upwardly into the closure applying apparatus. The ring 26 also serves as a resilient means for causing the outer peripheral edge portion of the cellulose acetate closure blank to be folded against the side of the bottle neck as the bottle is moved up into the closure applying head.

The chamber 19 formed in the closure applying head is provided with a threaded opening 29. Threaded in this opening is a steam inlet and exhaust pipe 30. The chamber 19 is also formed with an opening 31 which communicates with the chamber 32 formed in the closure applying head by the flexible rubber ring 21.

The chamber 20 formed in the closure applying head is provided with a threaded opening 33 in which is threaded a pipe 34. The chamber 20 is also formed with ports or openings 35 which communicate with the chamber 32 formed by the flexible rubber 21.

The steam inlet and exhaust pipe 30 leading to chamber 19 is provided with a three way valve 36 which is adapted to control the entry of steam into said pipe and chamber and also which is adapted to control the opening and closing of an exhaust conduit 38.

Figure 5:
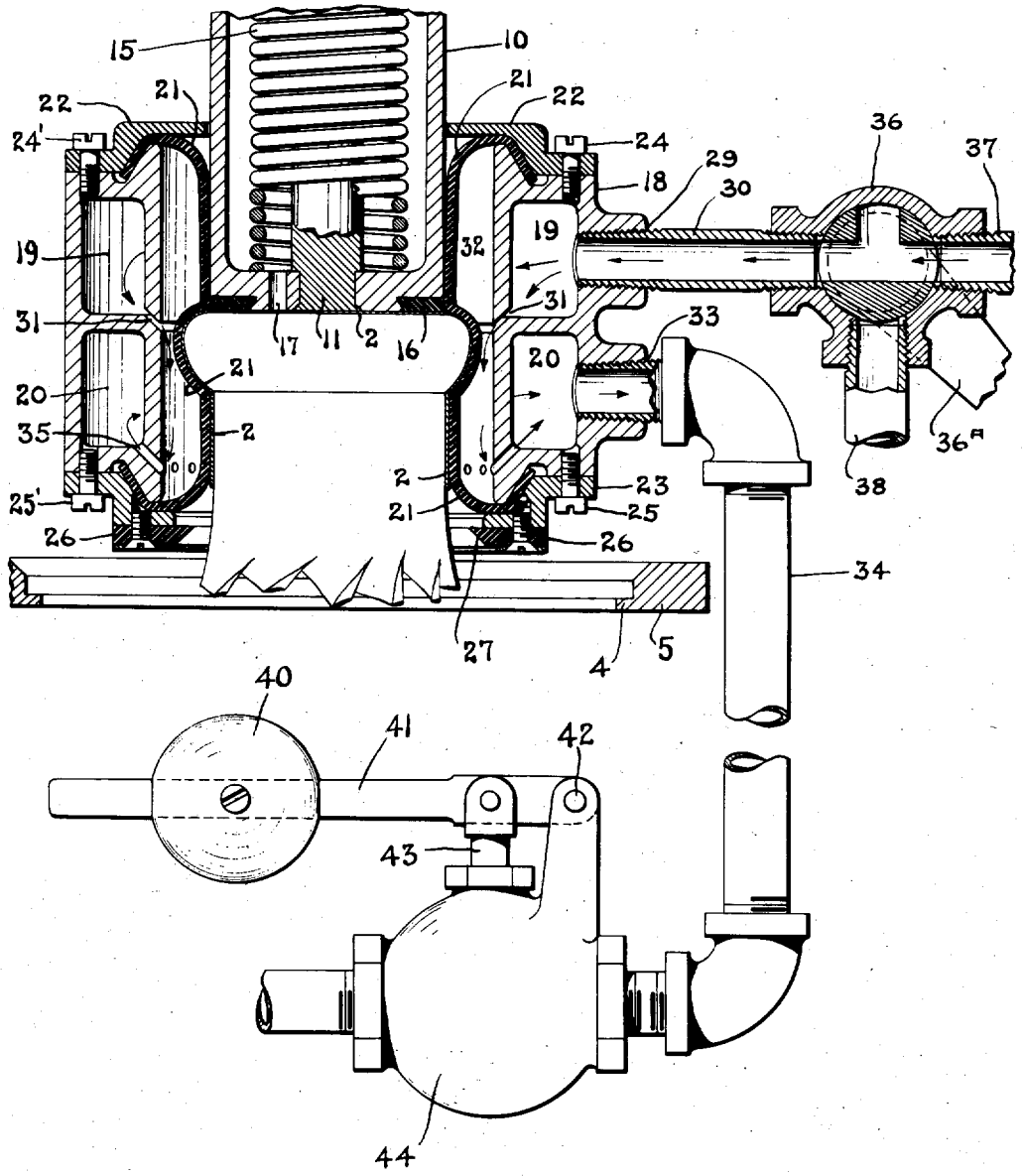
Figure 5 is a view showing the position of the parts after the bottle has been further advanced upwardly with respect to theh closure applying mechanism.

The pipe 34 leading from chamber 20 is provided with a relief valve 39 which may be of any well known type of construction, such for instance as the one illustrated in Fig. 5, at 44. In the relief valve illustrated a weight 40 is provided which is adjustable on a bar 41. The bar 41 is pivoted at 42 and controls the movement of the stem 43 which regulates the opening and closing of the relief valve in casing 44.

Steam is supplied under pressure to chamber 19 of the closure applying head through a pipe 37 and the pressure thereof is regulated by an automatic operation of the three way valve 36. I have indicated in Figs. 1 and 5 the mechanical connections 36A and 36B for operating the three way control valve. The valve as previously stated is operated automatically and in proper timed relation with respect to the advancing movement of the bottle neck into the closure applying head.

The operation of the closure operating mechanism and the method employed for effecting an air tight and liquid tight application of the cellulose acetate closure blank to the bottle or container will now be described.

With the bottle to which the closure is to be applied, in the position indicated at Fig. 1, and with the parts of the closure applying mechanism in their respective normal positions as indicated in said figure, a downward movement is caused to be imparted to the rod 11 of the cup or plunger 10 and an upward movement is given to the bottle. Such movements cause the closed end of the cup member 10 to clamp the closure blank 2 between it and the end surface of the bottle neck. The rubber ring 16 in the closed end of the cup plunger causes the material of the closure blank to become adjusted to any irregularities that might be present in the end surface of the bottle neck when said clamping action is effected. The position of the parts of the closure applying mechanism when the clamping action is completed is illustrated in Fig. 3 of the drawings.

Prior to the clamping of the closure blank to the bottle neck, steam, at a low pressure, is permitted to pass through the three way valve 36 and to enter and circulate in the chambers 19, 20 and 32 and consequently the closure applying head casting and the rubber ring 21 are caused to be warmed up or heated. The heat supplied to the closure applying head casting by said steam is also transmitted to the rubber guide ring 26 which is secured to the collar 23 by the screws 28, 28'.

The bottle neck is then caused to be gradually further advanced upwardly into the closure applying head and the cup member 10 of the closure applying apparatus while holding the closure blank against the mouth of the bottle and without release of its clamping action is caused to be moved upwardly in the capping head casting against the pressure of the spring 15.

During the upward movement of the bottle neck into the capping head the volume and pressure of the entering steam is increased so that the rubber ring 21 is caused to be extended and so that its extended diameter is slightly less than the diameter of the bottle neck. Therefore, as the bottle neck is further progressed upwardly said ring will frictionally engage the closure material and cause it to envelop said neck and shape itself to conform with the exterior of said neck.

Figure 4:
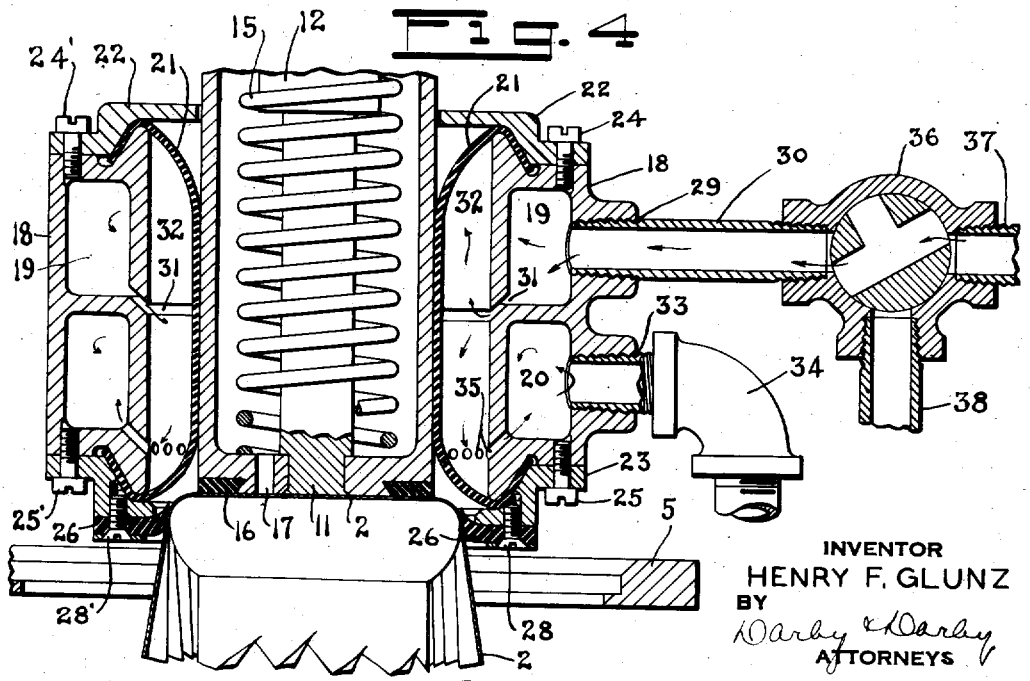
Figure 4 is a view similar to Fig. 3 and showing the parts in their respective positions as the bottle has been advanced further upwards with respect to the closure applying mechanism of the closure applying apparatus.

In Fig. 4, the top portion of the neck of the bottle is indicated as just entering the closure applying head. It will be noted that during this further upward movement of the bottle neck the heated rubber ring 26 of the closure applying head engages with the skirt portion of the cellulose acetate closure blank and causes the same to be folded downwardly in a crimped or pleated manner and in a direction towards the outer surface of the bottle neck. The heated condition of the ring 26 causes it to soften the cellulose acetate material of the skirt portion of the closure blank and reduce it to a molding state, and the inclined face 27 of said ring as it engages the softened pleated folds of the skirt portion effects an ironing out of said folds so that they will lay in a pressed intimate contact with the surface of the bottle neck.

In Fig. 4 it is also shown that at this stage of the operation of the apparatus, only a small volume of steam is permitted to enter the compartments of the closure applying head through the valve 36 and that therefore only enough heat and pressure is supplied to the apparatus to make it possible for the parts thereof to become warmed sufficiently to reduce the material of the skirt portion of the closure blank to a softened molding state and to effect a pressing of said softened cellulose acetate material to the bottle neck.

In Fig. 5 the bottle neck is shown as having been advanced upwardly into the closure applying head to a point where the top portion thereof is adjacent to the opening 31 in the chamber 19. During the movement of the bottle neck up to this position, the rubber ring 21 which has been sufficiently extended by reason of the steam pressure that has been so far introduced into the closure applying head has continuously and frictionally engaged with the pleated folds formed in the skirt portion of the closure blank and has completed the pressing of said folds into a molding contact with the exterior contour of the bottle neck.

By the time the top of the bottle has reached the position in the closure applying head as shown in Fig. 5 the valve controlling means for controlling the supply of steam to chamber 19 is caused to be operated so that it is opened to its widest extent and so that a full pressure of the heated steam is permitted to enter said chamber. The heated steam under full pressure after entering chamber 19 passes out of said chamber in a concentrated stream through the passage 31 and into chamber 32. The downwardly inclined directional shape of passage 31 causes the steam to be directed downwardly and at an angle into chamber 32 and so that it is directed against the rubber ring 21 at a point adjacent to where the passage 31 communicates with chamber 32. This continuous concentrated stream of steam combined with the increased pressure exerted on the ring 21 at this point causes the heated cellulose material of the closure blank to become heated and compressed to such an extent as the bottle is further advanced upwardly that said closure material will become fused with the surface of the bottle neck.

Figure 6:
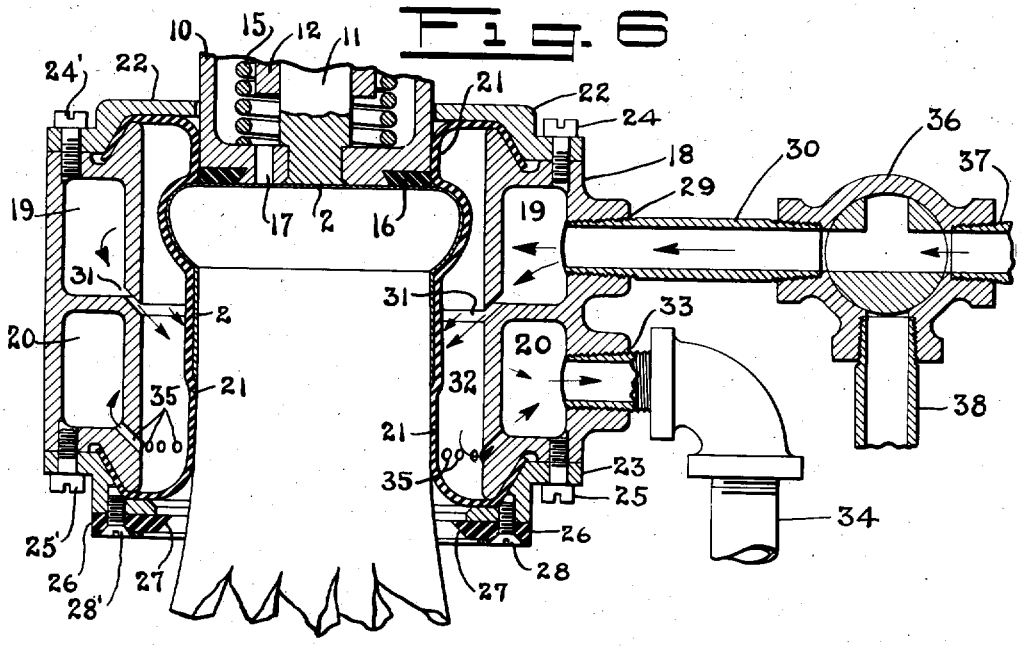
Figure 6 is a view similiar to Fig. 5 and showing the parts in their respective positions after upwardly with respect to the closure applying mechanism has been completed.
Figure 7:
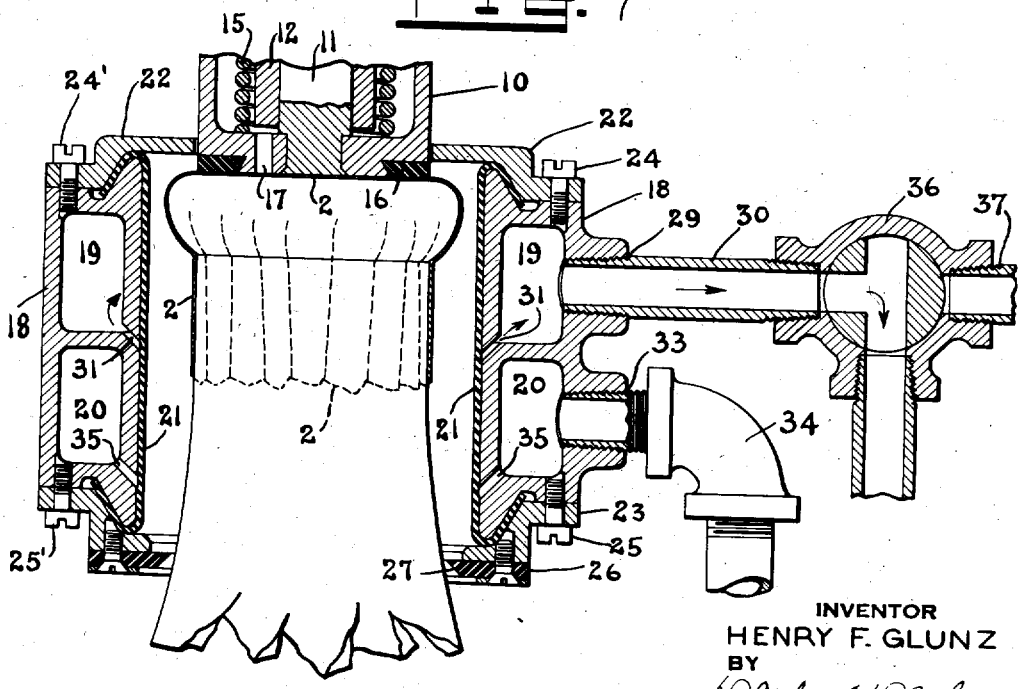
Figure 7 is a view similar to Fig. 6 and showing the parts in their respective positions after the closure applying and sealing mechanism has completed its work and the bottle with the closure applied thereto is ready to be removed from the closure applying mechanism.

After the bottle neck has had the cellulose acetate closure completely applied thereto in the manner above indicated, as shown in Fig. 6, the supply of steam under pressure is cut off by a suitable operation of the three way valve 36 and the exhaust pipe 38 is opened to communication with chamber 19 to permit the steam which has been used to extend rubber ring 21 and to apply the concentrated heated pressure as above explained, to be exhausted, thereby releasing the flexible ring from contact with the closure and the bottle neck and permitting the bottle with the closure applied to it to be withdrawn from the closure applying head. If desirable and to insure the removal of the flexible rubber ring from liability of contacting with any surface while the bottle is being withdrawn and while a new bottle is being inserted, instead of relying on the exhaust of the steam pressure medium, the closure applying head may be connected through pipe 38 with a vacuum and thereby the closure applying head may be quickly relieved of all pressure tending to distend the rubber ring.

During the introduction of the steam to chambers 19 and 32 the condensation of the steam will have a tendency to settle in the lower portion of chamber 32. Such condensation and also any surplus steam that may be built up in the said chamber is permitted to escape through the ports 35 into the chamber 20 of the closure applying head and thence out through the discharge pipe 34. The relief valve connected in said discharge pipe regulates the opening and closing of the said pipe when a certain predetermined pressure is built up in the apparatus and allowing such surplus steam and condensation to escape therethrough.

During the operation of the closure applying mechanism moisture condensed from the air is liable to form on the top of the closure material at the point where it is clamped to the top of the bottle neck by the control cup or plunger 10. If this moisture is allowed to form or to remain on the closure material at the point it will form a pocket and pressure created at this point will act on the cellulose acetate material to cause it to be expanded inwardly into the bottle neck. In order to prevent this from occurring the cup member 10 is provided with a port or opening 17 which permits any moisture that may form on the top of the closure material to escape therethrough when the mechanism or the closure applying apparatus is operated.

From the foregoing description it will be seen that I provide an exceedingly simple and efficient method of application of a cellulose acetate sealing closure to receptacles and I have also provided an exceedingly simple and efficient form of apparatus capable of use in carrying out my invention. While I have described a specific form of apparatus for carrying out the process and while I have shown the application of the principles of my invention to the capping of bottles, it is to be understood that I do not wish to limit or confine myself to the use of any particular type or structure of mechanism for carrying out my process, nor to any specific detail of the mechanical structure, except as hereinafter set forth in the claims. It is equally obvious that the principles of my invention are suitable for use in the application of other types of structures of caps or closures and to other structures of receptacles or containers.

When reference has herein been made to fusing the material of the closure cap to the container, it is understood that what is meant thereby is that when the material is subjected to the necessary heat the material will become closely adhesive to the surface of the container and will enter into the minute indentations and crevices therein in a manner which is impervious to air. In this sense fusion between the capping material and the surface of the container is obtained.

Having now set forth the objects and nature of my invention, what I claim as new and useful and of my own invention and desire to secure by Letters Patent is:—

1. The method of applying a sealing closure to containers which consists in preliminarily applying the closure by stretching the central portion thereof over the mouth of the container and bending the outer peripheral zone portion over the crown of said container, then subjecting the bent over outer peripheral zone portion to an elastic heated pressure to force the same into a conforming fit with the exterior shape of the sides of the container, and then finally subjecting the bent over portion, progressively throughout its length, to a concentrated and increased elastic pressure and a welding heat, to effect a fused application thereof to the container.

2. The method of applying sealing closures to containers which consists in positioning a container with respect to the closure, centering the closure over the mouth of the container, folding the outer peripheral edge zone of the closure over the crown of the container, then subjecting the folded edge zone portion to an elastic heated pressure to force the same into a conforming fit with the exterior shape of the sides of the container, then applying an increased elastic and heated pressure to the folded compressed portion of the closure to effect a fused application of the same to the exterior surface of the container, then withdrawing the pressure.

3. The method of applying sealing closures to containers which consists in centering the closure over the mouth of the container, then pleating and folding the outer peripheral edge zone of the closure over the crown of the container and during the pleating and folding operation warming the material of said pleats to a molding temperature, then subjecting said folded heated pleats to an elastic pressure to bring the same into a conforming contact with the sides of the container, and then progressively throughout the length of the compressed folded pleats applying thereto a concentrated welding heat and an increased pressure to effect a welded or fused and conforming application of the material of said pleats to the container.

4. The method of applying sealing closures to containers which consists in preliminarily folding the closure over the mouth of the container and during the folding operation subjecting the folded portion to the action of heat of a sufficient degree to reduce the same to a moldable state and then compressing the folded portion against the sides of the container by means of an elastic heated pressure sufficient to force the same into a final conforming and sealing position and to effect a fused application thereof with the sides of the container.

5. The method of applying sealing closures to containers which consists in folding the closure over the mouth of the container and then applying an elastic heated pressure to the folded portion to compress the same into conformation with the shape of the container, then applying an increased elastic and heated pressure to the folded compressed portion to effect a fused application of the material thereof to the exterior surface of the container.

6. The method of applying closures made from a sheet of cellulose acetate material to containers which consists in preliminarily applying the closure by stretching the same over the mouth of the container and bending the outer peripheral zone thereof over the crown of the said container, then subjecting the bent over outer peripheral zone portion to an elastic heated pressure sufficient to reduce the cellulose acetate material of said zone portion to a plastic state and to mold the same into a conforming fit with the sides of the container and then progressively applying to said molded material of said closure throughout the length an increased elastic pressure at a fusing temperature so as to produce a fused application thereof to the sides of the container.

7. The method of applying closures formed of sheets of cellulose acetate material to containers which consists in preliminarily folding the sheet of cellulose acetate material over the mouth of the container and during said folding operation, heating the folded portion and then subjecting the folded portion to an increased heat and to an elastic pressure to reduce the material thereof to a plastic state and to press the same into a conforming fit with the sides of the container, then increasing the heat and the pressure to cause said material of the folded portion to become fused to the sides of the container.

8. The method of applying a sealing closure formed of a sheet of cellulose acetate material to containers which consists of first clamping the central portion of said sheet of material over the mouth of the container, then causing the unclamped portion to be folded over the crown of the container and compressed against the sides thereof and during the folding and compressing operation providing the material of the folded and compressed portion of the sheet, first, with a heat and pressure sufficient to reduce it to a plastic state and to cause it to have a molded application to the exterior surface of the container, and finally, with a heat and pressure sufficient to cause it to become fused with the exterior surface of the container.

9. The method of applying a sealing closure formed of a sheet of cellulose acetate material to containers, which consists of first clamping the central portion of said sheet of material over the mouth of the container, then causing the unclamped portion to be folded over the crown of the container and to be compressed against the sides thereof, and during this folding and compressing operation heating the material so that it is reduced to a plastic state, then applying an increased pressure and heat to the compressed folded portion so that the material thereof will become fused with the exterior surface of the container.

10. The method of making and applying sealed closures to receptacles which consists of forming blanks of thin sheets of cellulose material, then centering said blanks over the mouth of a receptacle to be sealed and closed, then clamping the central portion of the blank against the mouth of the receptacle, then folding the unclamped portion over the crown of the receptacle and against the sides thereof, then subjecting the folded portion to a resilient heated pressure to reduce the same to a plastic condition and to press the same into a molded application with the sides of the container, then increasing the temperature applied to the material of the folded portion, and also the resilient pressure to effect a fused application of the material to the sides of the container.

11. The method of applying a closure formed of a sheet of cellulose material which consists in first subjecting the sheet of cellulose acetate material to the expansive action of a gaseous medium in a heated condition to force the material of said sheet into conformation with the shape of the container to which the closure is to be applied, and then finally subjecting the material of said sheet to an increased expansive action of said gaseous medium and at a higher temperature to effect a fusing of the material of said sheet to the exterior surface of the container.

12. The method of making and applying closures on containers which comprises forming blanks of thin sheets of transparent cellulose acetate material, then centering the same over the mouth of a container, then supplying the peripheral zone of the blanks with pleated folds at a temperature sufficient to soften the transparent cellulose material and bending said folds over the crown of the container, then compressing said folds against the sides of the container at a molding temperature and finally increasing the temperature of the compressed folded material to a fusing temperature and increasing the pressure thereagainst to cause said folded material to become fused to the sides of the container.

13. The method of making and sealing closures on containers which comprises forming blanks of thin sheets of cellulose acetate material, suspending the closure blank, then centering the mouth of the container to be closed and sealed beneath said blank, then folding the peripheral zone of said blank over the crown of the container, then compressing said folded portion against the sides of the container and at the same time warming the material thereof to a molding temperature, then heating the compressed material of said folded compressed portion to its fusing temperature and applying an increased pressure throughout its length to cause a fusing of the material to the sides of the container.

14. In an apparatus for applying a sheet of cellulose acetate to a container to provide a sealing closure therefor, means for resiliently clamping and maintaining the central portion of said sheet over the mouth of the container as the closure is being applied, heated resilient means for folding the unclamped portion of said closure sheet over the crown and against the sides of the container, heated resilient means for compressing said folded portion into a conforming fit with respect to the sides of the container, and means for providing said last mentioned heated resilient means with an increasing heat and pressure during the compressing operation to initially reduce the cellulose acetate material of the folded portion of said closure sheet to a plastic and moldable state so that it will conform to the exterior contour of the container sides, and finally, so that the said material will become fused or welded to the surface of the receptacle.

15. In an apparatus for applying a sheet of cellulose acetate to a container to provide a sealing closure therefor, resilient means for folding the outer peripheral edge zone of said closure forming sheet over the crown of the container, heated resilient means for compressing the folded peripheral edge zone into a conforming fit with the exterior contour of the sides of the container, and means for providing said last mentioned heated resilient means with an additional pressure and an increased heated temperature to effect a fusing application of the folded compressed portion of said cellulose acetate sheet to the sides of the container.

16. In an apparatus for applying a sheet of cellulose acetate material to a container to provide a sealing closure therefor, means for folding the outer peripheral edge zone of said closure forming sheet over the crown of the container and against the sides thereof, means comprising a ring of resilient material for compressing the folded peripheral edge zone into a conforming fit, with the exterior contour of the sides of the container, means for permitting steam to apply the necessary pressure to said ring of resilient material to cause it to perform the compressing operation and also to cause it to heat the cellulose acetate material of said folded portion so as to reduce it to a plastic state during the compressing operation, and also for increasing the heated temperature of said ring and the pressure thereof so that said cellulose acetate material will be fused to the sides of the container during the compressing action of the resilient ring.

17. In an apparatus for applying a closure formed of a sheet of cellulose acetate material to a container, a closure applying head adapted to receive the open end of the container, resilient means secured to said head for effecting the folding of the outer peripheral edge zone of the closure sheet over the crown of the container, as it is advanced into said head, a ring of resilient material secured in said head and adapted to compress the folded outer peripheral zone portion of the closure sheet against the sides of the container and with a conforming fit therewith, means for permitting steam to enter said head behind said ring to apply heat and pressure thereto, and means formed in said head for directing and concentrating the flow of incoming steam against said ring so that a greater peripheral and an increased heat is produced at a predetermined position of said ring than is provided at other portions thereof.

18. In an apparatus for applying and sealing closures on containers, a closure applying head, means for suspending a closure blank comprised of a thin sheet of cellulose acetate material in position with respect to said head, and above the mouth of a container to be closed and sealed, means for moving the container upwardly in a vertical direction into said head, resilient heated means secured to said head for guiding said container in its upward movement and for warming and frictionally enfolding the closure blank about the mouth of the container, a resilient ring member mounted in said head and adapted to frictionally close on the folded portion of said blank and to resiliently compress the material thereof into a conforming fit with the exterior surface of the container, means for providing a heated pressure to said resilient ring member during its compressing action to cause it to reduce the material of the folded portion to a plastic state and to mold the material to the sides of the container, means in said head for directing a concentrated pressure at a fusing temperature against said ring member to cause it to fuse the material of the folded compressed portion of the closure blank to the sides of the container.

19. In an apparatus for applying and sealing closures made of blanks of cellulose acetate material, on containers, a closure applying head, means for suspending a closure blank with respect to said head and above the mouth of a container to be closed and sealed, means for moving the container upwardly in said closure applying head, means in said head for effecting a folding of the closure blank about the mouth of the container, means associated with said head for resiliently compressing the folded portion of the closure blank into contact with the sides of the container, means for providing said resilient compressing means with a heated pressure sufficient to reduce the cellulose acetate material of the folded portion to a plastic state and to mold it to the side surface of the container, means in said head for providing a concentrated pressure at a fusing temperature directed to said resilient compressing means to cause it to fuse the molded plastic material of the folded portion of the closure blank to the sides of the container.

20. An apparatus for applying cellulose acetate closures to bottles comprising a closure applying head, adapted to receive the neck of the bottle, to which the closure is to be applied, a flexible rubber ring in said head adapted to embrace the necks of the bottles, a compression chamber around said rubber ring, means for admitting steam under pressure to said chamber and against said flexible rubber ring in a concentrated downwardly directed stream, means for exhausting said steam from said chamber while the neck of the bottle is within the closure applying head, and means for permitting the escape of an excess amount of steam in said chamber.

21. An apparatus for applying cellulose acetate closures to bottles, comprising a closure applying head adapted to have positioned therein a closure blank of said cellulose material and also adapted to receive the neck of the bottle to which the closure is to be applied, a flexible rubber ring adapted to surround the neck of the bottle within the head and to frictionally apply the closure to the bottle neck, a pressure chamber around said ring, means for admitting steam under pressure to said chamber to force said ring against the neck of the bottle and so that it will apply said closure thereto, means for permitting said steam to be exhausted from said chamber, while the neck of the bottle is within the closure applying head, means for automatically permitting an excess amount of steam pressure in said chamber to be discharged therefrom, and means in said head to resiliently hold said closure in centered clamped relation over the mouth of said container during the applying action of said flexible rubber ring.

22. An apparatus for applying cellulose acetate closures to bottles comprising a closure applying head adapted to receive the neck of a bottle to which the closure is to be applied, means for positioning a closure with respect to said head, a flexible rubber ring in said head adapted to embrace the said closure and the neck of the bottle and to apply the closure to said neck, a compression chamber around said rubber ring, means for admitting steam under pressure to said chamber, and against said flexible rubber ring in a concentrated downwardly directed stream to force said rubber ring against the closure and bottle neck, and means for regulating the force of the concentrated and downwardly directed steam pressure admitted to said chamber.

23. In an apparatus for applying a closure formed of a sheet of cellulose material to a container, a closure applying head adapted to receive the open end of the container, means for positioning a sheet of cellulose acetate material with respect to said head and the open end of the container, resilient means secured to said head for effecting a folding of the outer peripheral edge zone of the closure sheet over the crown of the container, as it is advanced into said head, a closed chamber in said head formed of a ring of resilient material and adapted to engage with and compress the folded outer peripheral edge zone of the closure sheet into a conforming fit with the exterior surface of the container, a further chamber formed in said head, means for supplying steam under pressure to said chamber, a passage formed in said chamber for permitting said steam under pressure to be directed in a concentrated stream into the chamber formed by the ring of resilient material and against the said ring, a further chamber formed in said head and having openings therein, communicating with the chamber formed by said ring, a pipe communicating with said last mentioned chamber to permit the escape of excess steam from said chamber and means associated with said pipe for regulating the escape of steam therethrough, and means associated with the first mentioned steam chamber formed in said head for exhausting the steam from the chambers formed in said head.

HENRY F. GLUNZ.